United States Patent Office 3,318,666
Patented May 9, 1967

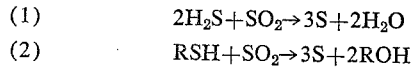

3,318,666
METHOD OF PREPARING DISPERSIBLE SULFUR
Richard L. Every and Ralph Leroy Grimsley, Ponca City, Okla., assignors to Continental Oil Company, Ponca City, Okla., a corporation of Delaware
No Drawing. Filed Feb. 1, 1965, Ser. No. 429,644
5 Claims. (Cl. 23—226)

This invention relates to preparation of sulfur. In another aspect, this invention relates to a method of preparing a dispersion of sulfur. In still another aspect, this invention relates to a method of recovering sulfur from gases containing sulfur compounds.

Sulfur is useful, generally as a sulfur emulsion, in such agricultural uses as fungicides, pesticides, miticides and insecticides. Also, such emulsions are useful, in pH control of the soil. Presently, it is common to apply dry sulfur to soil to lower the pH. Since sulfur is essentially insoluble in water, it requires about a year for the elements and the soil bacteria to break the sulfur down and change to pH of the soil. Of course, in some cases this is desirable. On the other hand, the emulsions of sulfur prepared by the method of this invention can be easily applied, and since it has an initial pH of about 0.5, there is an immediate response in lowering the soil pH.

Still other uses would be in reclamation of salt-damaged land in some areas. At present gypsum or dry sulfur is disked into the salt-damaged land, and then it is water flooded. Since sulfur is almost water insoluble, some difficulty is experienced in removing the cations on flooding. With the emulsion of this invention, this removal is much faster.

Several methods have been proposed for preparing sulfur from hydrogen sulfide gases, sulfur dioxide gases and other sour gases containing mercaptans. For example, Urban et al. in U.S. Patents 3,099,536 and 3,050,370 teach bubbling gases through solvents containing not more than about 40% water. The sulfur is formed in crystalline form. If greater amounts of water are used, the sulfur has a flocculant or tacky state which makes separation difficult. Brenner et al. in U.S. Patent 2,884,352 suggest forming colloidal sulfur by admixing powdered sulfur in polyalcohols and are able to obtain colloidal suspensions up to about 4%. However, in all of these methods a large amount of expensive solvents such as alcohols are required.

It is an object of this invention to provide a novel method of producing sulfur from gases containing sulfur compounds.

It is another object of this invention to provide a dispersion of sulfur in a carrier liquid.

It is still another object of this invention to provide a method of preparing sulfur emulsions of high sulfur content.

According to this invention, the above and other objects are accomplished by reacting a gas containing $SO_2$ in admixture with other sulfur compounds with water containing a small amount of an aliphatic alcohol.

By such reaction, it is surprisingly found that a dispersion of finely-divided sulfur is formed in the water. This is particularly surprising in view of the above-cited patents which teach that when the water content exceeds about 40%, a tacky agglomerate of sulfur is formed, also, in view of the prior art teaching that with certain alcohols, e.g. glycols, only about 4% suspensions are obtained.

In our method up to about 5% alcohol in water is very beneficial, and, in general, 0.5 to about 5% aliphatic alcohols of 1 to about 5 carbon atoms are added to the water prior to passing the sulfur compound containing gases therein. Preferably, we use from about 1 to about 3% alcohol solutions in water.

While we are not limited to any theory, it is believed the $SO_2$ reacts with the other gases such as:

(1) $$2H_2S + SO_2 \rightarrow 3S + 2H_2O$$

(2) $$RSH + SO_2 \rightarrow 3S + 2ROH$$

Gases suitable for treatment by the method of this invention are any gas which contains $SO_2$ with $H_2S$ or mercaptans. Such gases are natural sour gas as obtained from gas wells, sour gas from refining operations, sulfur-containing gases from sintering operations, synthetic prepared gases and the like.

As has been mentioned previously, the alcohols suitable in this invention are aliphatic alcohols of 1 to about 5 carbon atoms such as methanol, ethanol, propanol butanol, pentanol and the like. These can be primary, secondary or tertiary alcohols. Mixed alcohols can also be used. Preferably, we use methanol, ethanol and propanol since such alcohols are readily available and readily soluble in water.

Preferably, the alcohols are normal primary alcohols as mentioned above. However, other alcohols such as isopropanol, butanol-2, 2-methyl-propanol-1, 2-methyl-propanol-2, pentanol-2 and the like are also useful. Also polyalcohols such as glycol and glycerol are operable so long as such polyalcohols are soluble in water.

The sulfur formed is extremely fine, generally less than about 5 microns in size. This sulfur can be recovered from the resulting suspension by any of the well known means of separating solids from liquids. Preferably, the dispersion is allowed to stand until the suspended sulfur settles and the clear liquid decanted off leaving about a 50% solids-in-liquid mixture. This resulting mixture can then be dried by evaporation or further concentrated by centrifugation prior to drying. Contrary to the prior art teaching, the resulting sulfur which is agglomerated, readily breaks down into finely-divided powder by light abrasion such as in a ball mill, Banbury mill, screw-type mill, hammer mill or the like. This powder can again be readily suspended in water. By use of emulsifying agents, a stable emulsion can be formed.

To further described the invention, but not to be considered as limiting, are the following examples.

*Example I*

A two-liter graduated cylinder was filled two-thirds full of 2% ethanol in water. $H_2S$ and $SO_2$ were bubbled simultaneously into the graduated cylinder. The $H_2S$ and $SO_2$ immediately reacted to form sulfur. The sulfur suspended in the water was milky in dilute concentrations and yellow in heavy concentrations. After standing several hours, the sulfur settled to the bottom, but could be readily suspended again by merely shaking the cylinder. After standing, the clear water-alcohol solution was poured off leaving a suspension containing about 50% sulfur. This suspension was easily kept in suspension.

A portion of the solution was dried, and the resulting sulfur was broken down into a finely-divided powder by simple impact.

*Example II*

Sulfur dioxide and a sour natural gas containing 25% $H_2S$ were bubbled through a 2.5% methanol solution. The solution turned milky, and the gas was freed of sulfur contaminants. The solution was allowed to stand 24 hours, and the solids settled to the bottom. The clear liquid on top was decanted off, and the material remaining was about 50% sulfur in water. This material was readily dispersed by stirring.

The above examples are for illustrative purposes only, and are not intended to limit the invention. It should be understood that any gas containing $SO_2$ with $H_2S$ or mercaptans can be utilized to form the readily dispersible sulfur as formed by the method of this invention.

We claim:
1. A method of producing a dispersible sulfur from gases containing sulfur compounds comprising $SO_2$ plus another gaseous sulfur compound selected from the group consisting of hydrogen sulfide and mercaptans which comprises contacting said gases with a solution of 0.5 to 5% by weight of an aliphatic alcohol in water.
2. The method of claim 1 wherein the aliphatic alcohol contains 1 to 5 carbon atoms.
3. The method of claim 2 wherein said sulfur compound is $H_2S$.
4. The method of claim 2 wherein said sulfur compound is a mercaptan.
5. A method of producing finely-divided dispersible sulfur which comprises passing a gaseous sulfur containing fluid comprising $SO_2$ and a second sulfur containing gaseous compound selected from the group consisting of hydrogen sulfide and mercaptans into an aqueous solution of 0.5 to 5 weight percent of an aliphatic alcohol of 1 to 5 carbon atoms and recovering the resulting formed sulfur from the product.

References Cited by the Examiner

UNITED STATES PATENTS 2,690,961   10/1954   Kieth _____ 23—225

OTHER REFERENCES

E. Matthews, Chemistry Soc. Jour., part II (1926), pages 2270–2273.
Mellor's Modern Inorganic Chemistry, 1939 edition, page 441 relied on.

OSCAR R. VERTIZ, *Primary Examiner.*

A. GREIF, *Examiner.*